United States Patent [19]

Olson, Jr.

[11]  4,419,896

[45]  Dec. 13, 1983

[54] FORCE OR VIBRATION INDICATING DEVICE UTILIZING MICROWAVE RESONANCE FERRAMIC GYRATORS

[76] Inventor: Carl O. Olson, Jr., 8705 Little River Tpke., Annandale, Va. 22003

[21] Appl. No.: 296,852

[22] Filed: Aug. 27, 1981

[51] Int. Cl.³ .......................... G01N 29/00; G01L 1/00
[52] U.S. Cl. .................................... 73/652; 73/862.41; 73/DIG. 1
[58] Field of Search ...................... 73/862.41, 649, 652, 73/DIG. 1; 324/58.5 C, 58.5 R; 177/190

[56] References Cited

U.S. PATENT DOCUMENTS 3,529,470  9/1970  Agar ................................. 73/DIG. 1
3,779,072  12/1973  Meier ............................... 73/DIG. 1

*Primary Examiner*—Anthony V. Ciarlante

[57]  ABSTRACT

A very sensitive force or vibration indicating device is claimed and made by the use of the movement of a ferramic rod or slab of a microwave resonance ferramic gyrator in operation with microwave energy. The movement of the ferramic rod or slab is mechanically connected to a force or vibration source. The varied detected output of microwave energy produced by a phase shift caused by the gyrator is detected as a very sensitive indication of force or vibration applied.

1 Claim, 3 Drawing Figures

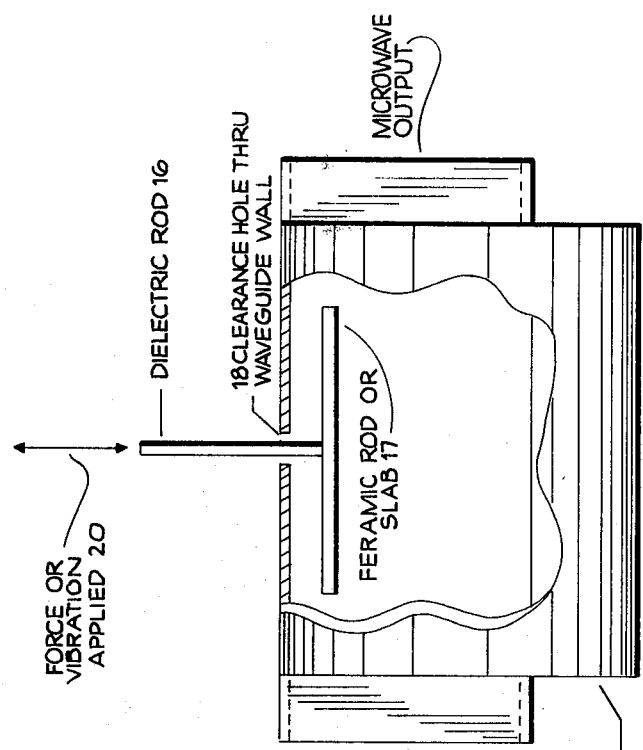
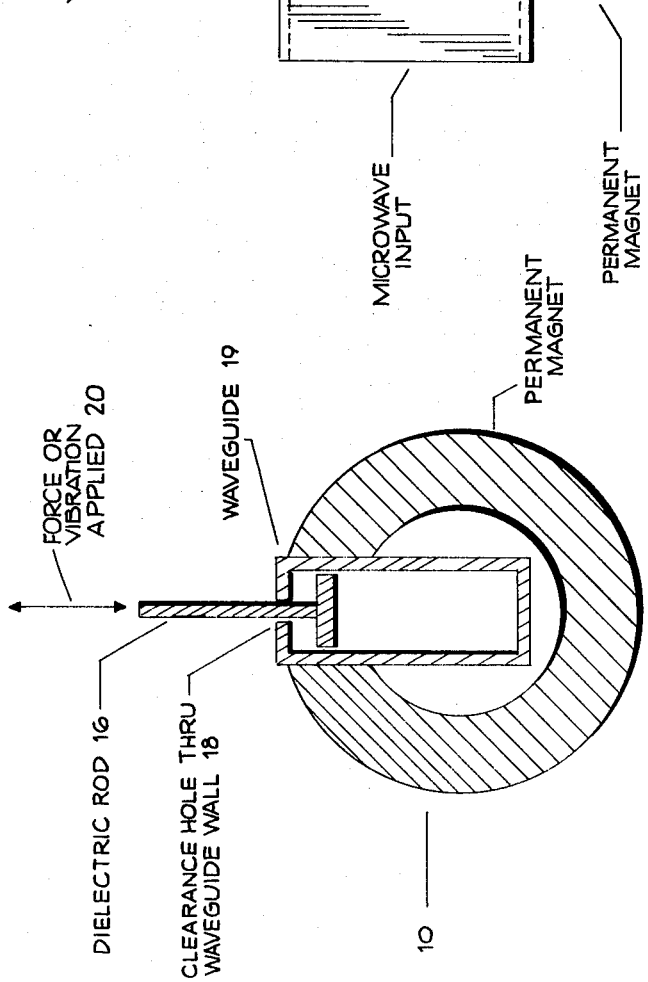

FORCE OR VIBRATION INDICATING DEVICE UTILIZING MICROWAVE RESONANCE FERRAMIC GYRATORS

BACKGROUND OF INVENTION

This invention relates to a force or vibration indicating device made by the movement of a ferramic rod or slab in a microwave waveguide ferramic gyrator operating in a microwave waveguide bridge. The microwave bridge electrical balance is altered by the movement inward or outward of a free moving ferramic rod or slab in a waveguide gyrator in one arm of the bridge. The movement of the rod or slab is by a small dielectric rod connected to both the applied force or vibration to be measured and to the ferramic rod or slab inside the gyrator thru the waveguide wall. The movement controls the microwave electrical phase shift of the gyrator and in turn, this microwave power after passing thru the gyrator connected in one arm of the microwave bridge thru magic tee's (hybrid junctions) is compared to a fixed phase shift in the other bridge arm and is detected. The recalibrated and detected bridge unbalance is a direct measure of the force or vibration to be measured.

SUMMARY OF THE INVENTION

According to the present invention optimum force or vibration measurement is obtained with the use of microwave resonance ferramic gyrator slab movements relative to the applied force to move the ferrite slab in the gyrator in combination with the components described in the operation of the invention. Since a small movement of the ferramic rod or slab produces a magnitude change in the phase shift of the gyrator in microwave energy which is not possible with ordinary probes or dielectric phase shifters. Advantageously, the movement of the force sensing components are free in air and do not depend on any physical contact to any part of the microwave measuring system other than the small dielectric rod or ferrite slab in order to transmit movement caused by the force applied to be measured. No balancing magnetic fields are needed and any variation of the input microwave power can be zeroed on the detector before using. Further, present scales or force and vibration devices using a light beam for detection of forces applied have only a ruler deflection and do not have the advantage of a simple continuous detector dial reading. Further, it is difficult to remote a light scale or force defecting systems thru light beams. In the present invention this is easily done by extending the lengths of the waveguide or by cables to remote positions of the force measuring device from the recording position, or by means of microwave links the force or vibration devices can be remotely located and conveniently read at a central position. The microwave detector output can also be easily converted to a digital signal by the addition of an A/D converter for the microwave detector output.

BRIEF DESCRIPTION OF THE DRAWINGS

Embodiments of the invention described herein are contained and specific reference is made to the figures in the drawings.

FIG. 2 and 2a shows the variable microwave waveguide gyrator.

Figure 1:
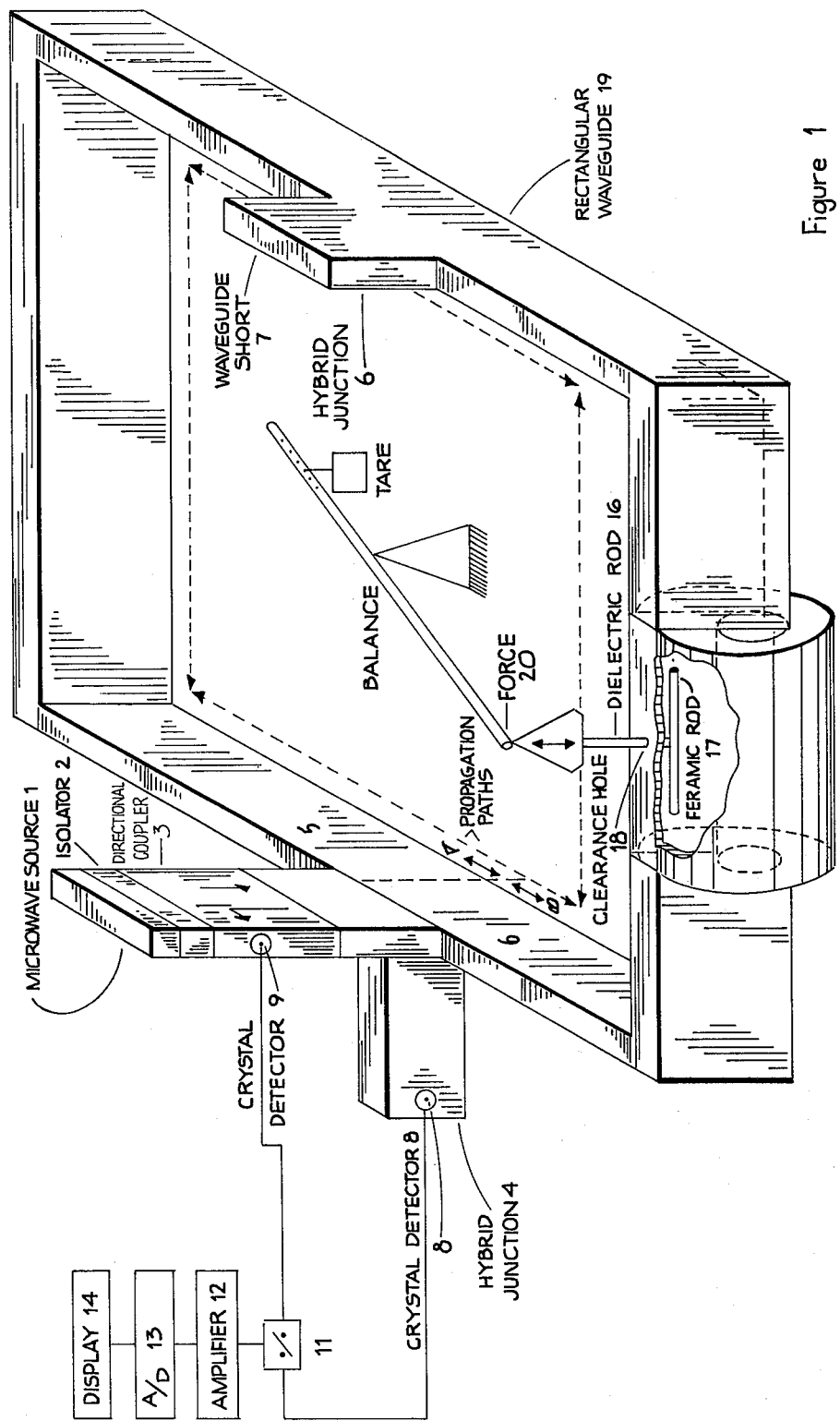
FIG. 1 shows the invention as applied to a beam scale or force measuring system.

It is to be understood that the foregoing description and accompanying drawings relates to embodiments set out by way of illustration not by way of limitation. Numerous other embodiments and variations are possible with the spirit and scope of the invention—its scope being defined by the appended claims.

DESCRIPTION OF INVENTION

The invention as applied to a force measurement system consisting of a beam balance scale with accompanying adjustable tare weight now will be described by way of example and reference to the accompanying drawings. FIG. 1 consists of a microwave source (1) connected thru a waveguide isolator (2) and directional coupler (3) connected to a magic tee (4) (hybrid junction) waveguide configuration where the power is split between the two rectangular legs (5) and (6). One leg contains a gyrator as shown in FIG. 2 and 2a; the other leg causes a fixed phase shift and contains another magic tee (7).

It is known that a gyrator in microwave use produces zero phase shift for one direction of propagation and a 180° phase shift for the other direction. Thus for one direction of propagation signals from (5) and (6) arms of the hybrid (4) arrive at hybrid (6) in phase since the electrical lengths of both propagation paths A and B are set to the same electrical length while signals from hybrid (6) caused by the waveguide short (7) in the reverse direction arrive at the input out of phase caused by the reverse 180° phase shift of the gyrator and are so transmitted by the E plane arm of hybrid (4) containing the crystal detector (8). In this way complete transmission occurs between (1) to (7) to (8). With the application of the gyrator (10) as shown in FIGS. 2 & 2a the phase shift between (7) and (8) via (10) is altered by the movement of the ferrite rod or slab and propagation is not complete to the crystal detector at (8). The microwave power at crystal detector (8) is reduced and the power at crystal detector (9) is increased by the change of the reverse phase shift in the gyrator caused by force applied to move the ferramic rod or slab in the gyrator interior by a dielectric rod connected to the slab or rod thru a small clearance hole to the interior of the gyrator as shown in FIGS. 2 and 2a. The invention is now clearly apparent that with an electrical short placed at port (7) and a gyrator (10) with a movable ferramic slab or rod connected by dielectric rods thru clearance holes in the waveguide gyrator to the external force applied replacing a fixed 180° phase shift gyrator, the output voltage of crystal detectors (8) and (9) will be varied according to the movement of the ferrite slab in the gyrator (10). The detected output of crystal (8) compared to the reflected power returning thru crystal (9) is a very sensitive indication of the force applied thru the dielectric rods to the gyrator (10). The ratio of power after calibration in crystal (8) compared to the power reflected into crystal (9) when directed thru a meter (11), thru an amplifier (12) thru A/D converter (13) and to display (14) is a direct measure of force or vibration applied to the dielectric rod in the gyrator.

FIG. 2 and 2a shows the gyrator (10) with an accompanying permanent bias magnet and the movable ferramic rod or slab within the waveguide. A small dielectric rod (16) is cemented to the movable ferramic rod or slab (17) and connected to pivot or fixed and cemented to the exterior weight, force or vibration applied (20) thru a small clearance hole (18) in the side of the waveguide (19). Initial setting of the ferramic rod or slab is for a position of 180° microwave phase shift thru the gyrator. Any deviation from this position of the ferramic rod or slab in the presence of the gyrator permanent magnetic bias field caused by force or vibration applied thru the dielectric rod increases or decreases the phase shift thru the gyrator and unbalances the microwave bridge arrangement as shown in FIG. 1 and described in the operation of the invention.

A further embodiment of the invention shown in FIG. 1 is where the force applied to move the ferramic rod or slab in the gyrator is applied thru the dielectric rod connected to a vertical pendulum to measure seismographic oscilations.

What is claimed:

1. A device for measuring an applied weight, force or vibration comprising:
   (a) a microwave energy source capable of transmitting energy,
   (b) a microwave bridge waveguide connection containing in one arm a variable phase shift gyrator with a movable ferramic rod or slab, said movable ferramic rod or slab is connected by a free moving small delectric rod to a means for receiving a weight, force or vibration source, the dielectric rod passes thru a small clearance hole in the side of the waveguide gyrator, whereby movement of the ferramic rod or slab in the gyrator produces an accompanying microwave phase change and bridge unbalance which is detected as a measure of the applied weight, force or vibration.

* * * * *